United States Patent
Gous et al.

(10) Patent No.: US 6,763,241 B2
(45) Date of Patent: Jul. 13, 2004

(54) DATA COMMUNICATIONS SYNCHRONIZATION USING GPS RECEIVER

(75) Inventors: John Peter Gous, Vista, CA (US); Timothy J. Stevenson, Vista, CA (US)

(73) Assignee: Varitek Industries, Inc., Houston, TX (US)

( * ) Notice: Subject to any disclaimer, the term of this patent is extended or adjusted under 35 U.S.C. 154(b) by 404 days.

(21) Appl. No.: 09/835,893

(22) Filed: Apr. 16, 2001

(65) Prior Publication Data

US 2002/0037732 A1 Mar. 28, 2002

Related U.S. Application Data (60) Provisional application No. 60/197,051, filed on Apr. 14, 2000, and provisional application No. 60/236,682, filed on Sep. 29, 2000.

(51) Int. Cl.[7] .............................................. H04B 7/005
(52) U.S. Cl. ................. 455/502; 455/67.1; 342/357.1
(58) Field of Search ............................. 455/502, 67.1, 455/231, 51.1, 457, 13.2, 13.3, 517; 342/357.01, 357.02, 357.03, 357.1, 357.12, 357.06

(56) References Cited

U.S. PATENT DOCUMENTS

| | | | |
|---|---|---|---|
| 5,365,450 A | * 11/1994 | Schuchman et al. ...... 455/456.3 |
| 5,367,524 A | 11/1994 | Rideout, Jr. et al. ..... 370/104.1 |
| 5,510,797 A | 4/1996 | Abraham et al. ........... 342/352 |
| 5,874,914 A | * 2/1999 | Krasner ................. 342/357.12 |
| 5,875,402 A | 2/1999 | Yamawaki ................... 455/502 |
| 5,913,170 A | * 6/1999 | Wortham .................... 455/457 |
| 5,970,400 A | * 10/1999 | Dwyer ........................ 455/254 |
| 6,166,651 A | * 12/2000 | Kushita ....................... 340/7.1 |
| 6,317,603 B1 | * 11/2001 | Allison ..................... 455/456.1 |
| 6,321,090 B1 | * 11/2001 | Soliman ..................... 455/440 |
| 6,332,086 B2 | * 12/2001 | Avis ........................... 455/574 |
| 6,542,821 B2 | * 4/2003 | Krasner ...................... 701/213 |
| 2003/0055562 A1 | * 3/2003 | Levy et al. ................. 701/214 |

* cited by examiner

Primary Examiner—Nay Maung
Assistant Examiner—Tan Trinh
(74) Attorney, Agent, or Firm—Cochran Freund & Young LLC (57) ABSTRACT

Disclosed is a system that uses GPS synchronization pulses in a communications system to provide synchronization of the transmission of data during assigned time slots. In addition, mobile units can calculate the distance from a base station based upon GPS coordinates that are provided by the GPS system. The distance of the mobile unit from the base station is then used to calculate the time required to transmit data from the mobile unit to the base station so that data from the mobile unit arrives at the base station during the assigned time slot for that particular mobile unit. Additionally, base station synchronization pulses are transmitted by the base station to the mobile units to empirically synchronize the internal bit clocks of the mobile units to insure proper sampling of data.

8 Claims, 14 Drawing Sheets

DATA COMMUNICATIONS SYNCHRONIZATION USING GPS RECEIVER

CROSS REFERENCE TO RELATED APPLICATIONS

This application claims the benefit of U.S. provisional application Serial No. 60/197,051 filed Apr. 14, 2000 entitled "Data Communications Synchronization using GPS" and U.S. provisional application Serial No. 60/236,682 filed Sep. 29, 2000 entitled "Communication System."

BACKGROUND OF THE INVENTION

1. Field of Invention

The present invention pertains generally to communications technology and more particularly to the synchronization of the transmission of data in time slots.

2. Background of the Invention

Currently, there are three common approaches for transferring data over a wireless communication link. The first approach uses a contention system that operates such that any mobile or fixed unit which is transmitting a data message over a wireless communication link can do so at any time. In this type of wireless communication system, if any two or more devices transfer information over the wireless communication link at the same time, the data transmitted from these two or more devices will interfere with each other such that data messages will most likely be lost. This can occur even though busy link detect logic is utilized since both the mobile and fixed units may test the link at the same time and transmit data believing that the link is clear.

The second approach uses a poling system that employs queuing. In a poling system, the base station sends a data message over the wireless communication link which queues a particular mobile unit to transfer data in the next time slot. The fixed unit transmits a data message that contains an identification number of the mobile unit indicating that the mobile unit should communicate data during the next time slot. The mobile unit decodes the data message and determines that it has been queued and then transfers data over the wireless communication link. The fixed unit will delay transmission of a queue data message to another mobile unit for a predetermined time in order to allow the first mobile unit to send messages. After a delay timer has expired, the fixed unit then sends the next queue data message to the next mobile unit. The process repeats until all of the mobile units have been queued. Hence, the poling system prevents units from using the same wireless communication link at the same time so that data throughput is increased. However, for each data message sent by the mobile unit, there must be a queue message sent by the base station, thus doubling the required amount of air time needed for communicating.

The third approach uses internal clock systems and pre-assigned time slots. In accordance with this approach, each mobile unit and base station utilize an internal time clock to determine the time at which that particular unit can transmit data (transmit time). This technique maximizes channel efficiency since collisions do not occur and poling is not required. Using this method, each mobile unit and base station is assigned a time slot of a given duration during which that unit can use to transmit data. However, such systems require complex clock synchronization techniques to insure that each unit is synchronized with the other units in the system and to prevent data collisions.

Various techniques have been used to synchronize the transmission of data in time slots that employ GPS synchronization such as disclosed in U.S. Pat. No. 5,367,524 issued Nov. 22, 1994 entitled "Method for Sequential Data Transmission," U.S. Pat. No. 5,510,797 issued Apr. 23, 1996 entitled "Provision of SPS Timing Signals," and U.S. Pat. No. 5,875,402 issued Feb. 22, 1999 entitled "Time-Synchronous Communication System", all of which are specifically incorporated herein by reference for all that they disclose and teach. Although each of these references discloses the use of GPS synchronization signals to transmit data in assigned time slots, none of these systems discloses the use of empirically derived synchronization signals to remove error skew that may exist within the system so as to ensure proper sampling of data.

Hence, it would be advantageous to have a simple technique for synchronizing the transmission of data between various units and a base station in a system where mobile units are used that are continuously changing location and ensure that proper sampling can occur by using both GPS synchronization and empirically derived synchronization.

SUMMARY OF THE INVENTION

The present invention overcomes the disadvantages and limitations of the prior art by providing a system that synchronizes the transmission of data between multiple units and a base station by using a GPS synchronous clock signal. The GPS synchronous clock signal is transmitted to mobile units and a base station and is capable of providing a synchronized universal time clock that is independent of the location of the mobile unit. The internal bit clocks of the mobile units and the base station are synchronized with a GPS sync pulse. Each mobile unit then calculates the transmission delay between the mobile unit and the base station using the GPS location coordinates of the mobile unit and the GPS location coordinates of the base station to determine a transmission distance. The channel delay of the mobile unit, which is the delay of the internal circuitry of the unit is then combined with the distance delay to calculate a transmission time. The mobile unit can be calibrated at the factory and stored in the mobile unit. Alternatively, the channel delay can be calibrated in the field periodically. The channel delay and the calculated distance delay are then combined to determine the time at which date should be transmitted in accordance with the assigned time slot of the mobile unit. A time slot for each mobile unit can be assigned during log-on of the mobile unit to the system or can be pre-assigned.

The present invention also corrects any additional error skew that may be encountered in the system. Error skew is corrected by transmitting a preamble with each data burst that is transmitted from the base station to the mobile unit that comprises a series of ones and zeros. The error skew is then determined by detecting the skew that exists between the delay data pulse and the bit clock that has been synchronized with the GPS sync pulse. In this fashion, synchronization of the bit clock of each of the mobile units with the actual data received from the base station is insured.

The present invention may therefore comprise a method of synchronizing the transmission of information in assigned time slots between mobile transceiver units having GPS receivers and a base station having a GPS receiver comprising: using the GPS receiver in the mobile units for receiving GPS synchronization data; using the GPS receiver in the base station to receive the GPS synchronization data; using a GPS synchronization pulse generated from the GPS synchronization data to synchronize internal bit clocks in the mobile units and the base station to provide GPS synchronized internal bit clocks in the mobile units and the base station; transmitting base station synchronization pulses from the base station to the mobile units that are synchronized with the GPS synchronized internal bit clock of the base station; further synchronizing the GPS synchronized internal bit clocks of the mobile units with the base station synchronization pulses to produce empirically synchronized internal bit clocks of the mobile units; transmitting data from the mobile units in assigned time slots using the empirically synchronized internal bit clocks of the mobile units.

The present invention may further comprise a system for synchronizing the transmission of data in assigned time slots comprising: mobile units that have communication transceivers; a base station having a communication transceiver for communicating with the mobile units; GPS receivers disposed in the mobile units and the base station that receive GPS synchronization data and generate GPS synchronization pulses and GPS coordinate information from the GPS synchronization data; internal bit clocks disposed in the mobile units and the base station that are calibrated to the GPS synchronization pulses to produce GPS synchronized internal bit clocks; logic control devices disposed in the mobile units that are programmed to control the transmission of data from the mobile units to the base station in assigned time slots and that are programmed to further synchronize the GPS synchronized internal bit clocks of the mobile units with base station synchronization pulses, the base station synchronization pulses being synchronized with the GPS synchronized internal bit clock of the base station.

The advantages of the present invention are that the GPS sync pulse is used to synchronize each of the mobile units and the base station. Additionally, each of the mobile units, which may be moving and changing locations, can utilize its GPS coordinates to determine the distance between the mobile unit and the base station. The transmission delay can then be calculated in a simple and easy fashion and as frequently as several times a second. In this manner, each mobile unit can be assured that data transmitted from the mobile units arrive at the base station during the assigned time slots for each mobile unit. Hence, mobile units that contain GPS receivers can utilize those receivers in a very advantageous fashion to synchronize transmissions in a time division multiplexed communication system. Further, empirically detected error skew can be eliminated using synchronization pulses transmitted from the base station to the mobile units.

DETAILED DESCRIPTION OF THE PREFERRED EMBODIMENT OF THE INVENTION

Figure 1:
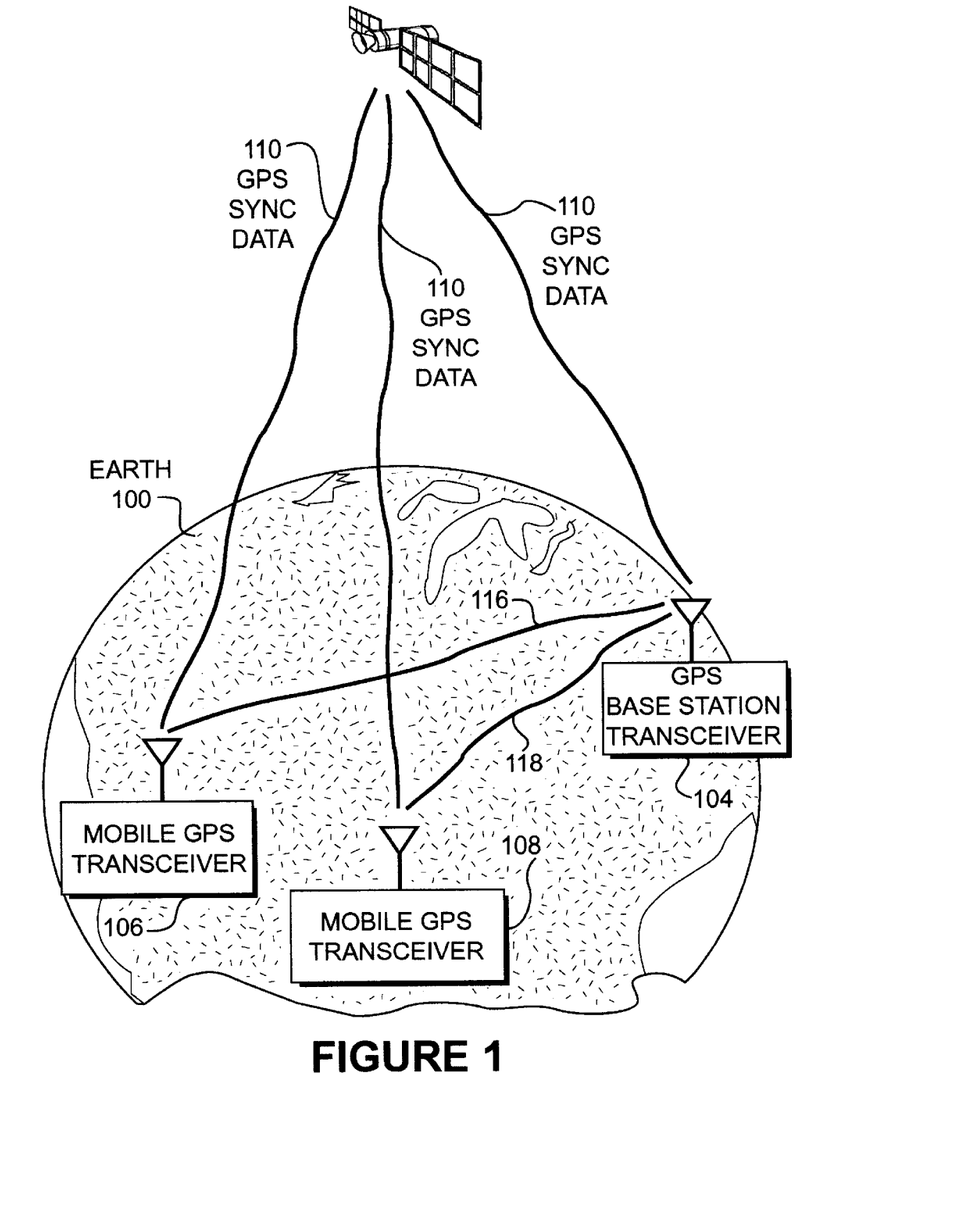
FIG. 1 is a schematic diagram illustrating the manner in which mobile GPS transceivers and a GPS base station transceiver communicate data and receive GPS sync pulses from a GPS satellite.

FIG. 1 is a schematic illustration of the communication system of the present invention. As shown in FIG. 1, a GPS base station transceiver 104 is located at a fixed or mobile location on the surface of the earth 100. A geo-synchronous GPS satellite 102 is positioned to transmit GPS sync data to the GPS base station transceiver 104 and various mobile transceivers such as mobile GPS transceiver 106 and mobile GPS transceiver 108. The GPS base station transceiver 104 and the mobile GPS transceiver 106, 108 may comprise units that include GPS receivers as well as other transceiver devices such as cell phones, pagers, or other radio links. For example, the present invention may include a base station and mobile units such as disclosed in U.S. provisional patented application Ser. No. 60/236,682 filed Sep. 29, 2000 entitled "Communication System." The present invention may be used with any type of transmission scheme that uses time slots including TDMA systems and various systems that are used for cell phone communications. In fact, the present invention may be particularly applicable to use with cell phone technology.

Another particularly useful application of the present invention is in telemetric systems that utilize GPS receivers that track the location of remote mobile units such as disclosed in U.S. provisional patent application Ser. No. 60/236,682 filed Sep. 29, 2000 entitled "Communication System." The present invention can be utilized for communicating data via a cell phone system or other wireless transmission links such as radio communications links.

As shown in FIG. 1, each of the mobile transceivers includes a GPS receiver that receives information from the GPS satellite 102. GPS satellite 102 may comprise a number of different satellites that provide GPS information. For example, mobile GPS transceiver 106 receives a GPS sync signal 110 from the GPS satellite 102 that is embedded in the GPS information sent by the GPS satellite 102 to the GPS receivers. The GPS receivers generate a GPS sync pulse and a global time clock information locally in the mobile units and the base station. Similarly, mobile GPS transceiver 108 receives the GPS sync signal 110 from the GPS satellite 102. Similarly, GPS base station transceiver 104 receives the GPS sync signal 110 from the GPS satellite 102. The GPS sync pulse generated by the GPS receiver is a pulse that is generated each second. The GPS receivers located in the mobile units 106, 108 and the base station 104 use the GPS sync pulse to generate clock signals that are accurate within 50 nanoseconds of a universal standard time, that is not dependent upon the particular location of the mobile unit or base station. The mobile units 104, 108 communicate with the base station 104 via wireless links 116, 118. Using time division multiplexing techniques, a particular frequency channel can be divided into a number of different time slots. The mobile units 106, 108 may be pre-assigned a particular time slot for transmitting data. Similarly, the base station 104 may have pre-assigned time slots for transmitting information. Alternatively, the base station 104 may assign time slots to the mobile units 106, 108 whenever the mobile units log on to the system. A pre-assigned time slot may be used for logging-on or a different frequency channel may be used, in accordance with standard techniques.

Figure 2:
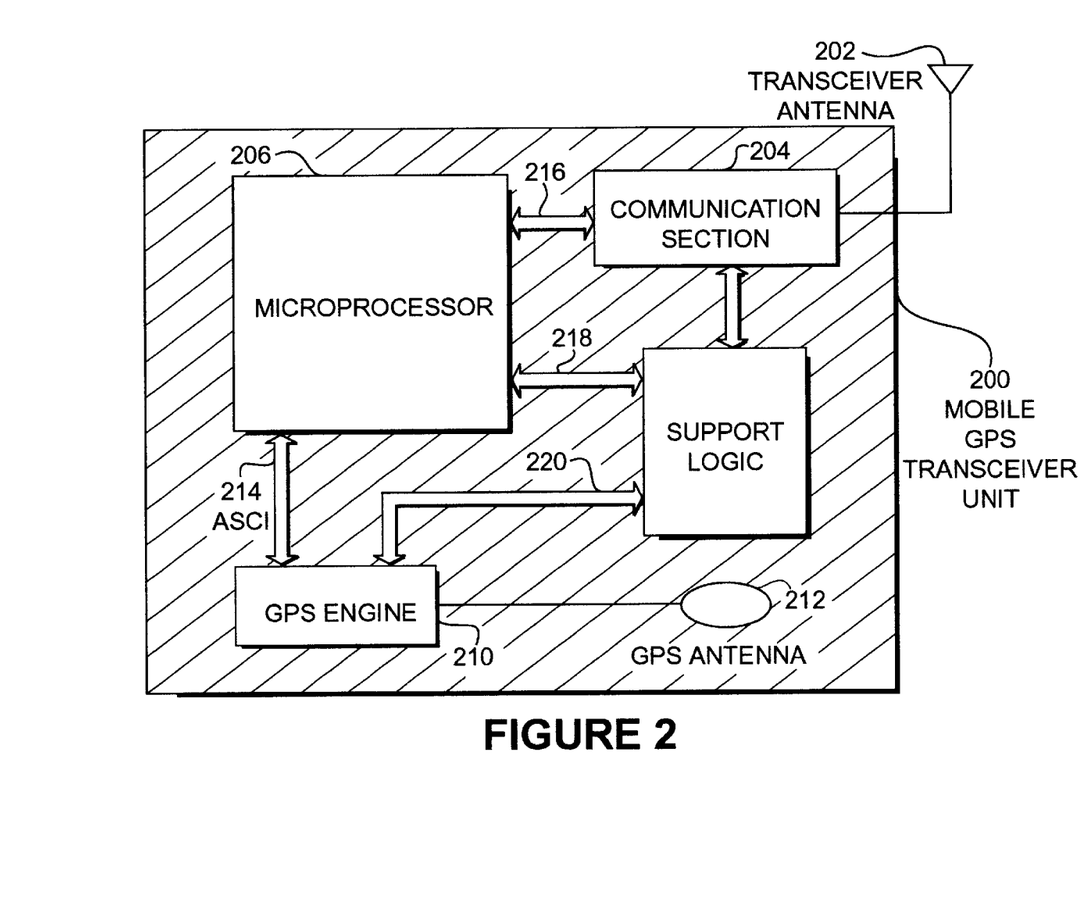
FIG. 2 is a schematic block diagram of a mobile GPS transceiver unit.

FIG. 2 is a schematic block diagram of a mobile GPS transceiver unit 200. As shown in FIG. 2, the mobile GPS transceiver unit 200 includes a transceiver antenna 202 for sending and receiving data between the mobile unit and the base station. The transceiver antenna 202 is connected to a communications section 204 that includes receivers and transmitters. The mobile GPS transceiver unit 200 also includes a microprocessor 206 that is coupled to the communications section 204 via link 216. Support logic 208 is also included in the mobile unit 200 that is coupled to the communication section 204 via link 222 and to the microprocessor 206 via link 218. The microprocessor 206 is coupled to the GPS engine 210 via an asynchronous serial communications interface 214. The support logic 208 is coupled to the GPS engine 210 via link 220. GPS engine 210 is coupled to a GPS antenna 212 that receives GPS information from the GPS satellites. The operation of the mobile unit is disclosed in more detail with respect to FIG. 5, below.

Figure 3:
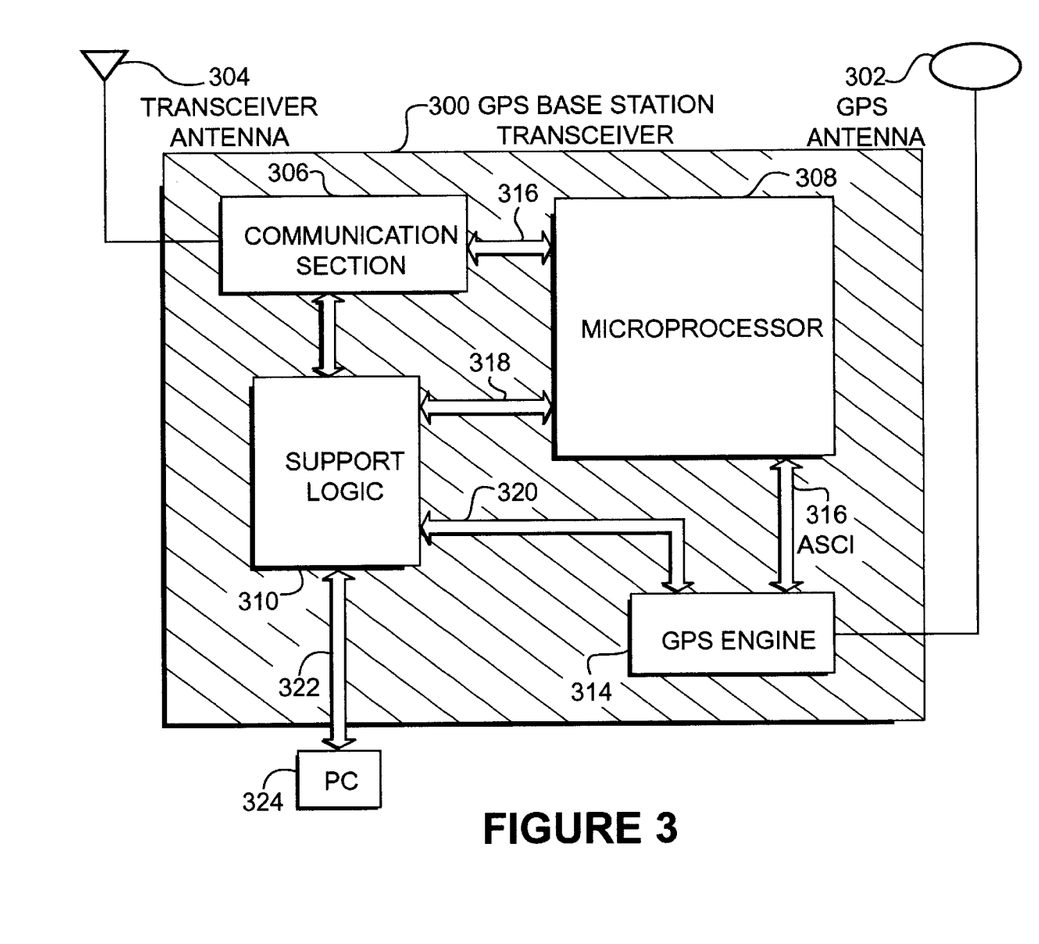
FIG. 3 is a schematic block diagram of a GPS base station transceiver.

FIG. 3 is a schematic block diagram of the GPS base station transceiver 300. The GPS base station transceiver 300 includes a GPS antenna 302 that is coupled to a GPS engine 314 that receives GPS information from the GPS satellites. A transceiver antenna 304 provides a wireless communication link to the mobile units. Transceiver 304 is coupled to a communications section 306 that includes receivers and transmitters. The base station 300 is constructed in a manner similar to the mobile unit and includes a microprocessor 308 that is coupled to support logic 310 via link 318. The microprocessor 308 is also coupled to the GPS engine 314 through an asynchronous communications interface 316. Support logic 310 is coupled to the GPS engine 314 via link 322. In addition, a personal computer 324 may be coupled to the support logic 322 for providing programming changes to the base station 300. The operation of base station 300 is disclosed in FIG. 4 and performs operations similar to the mobile unit, as disclosed in FIG. 5.

Figure 4:
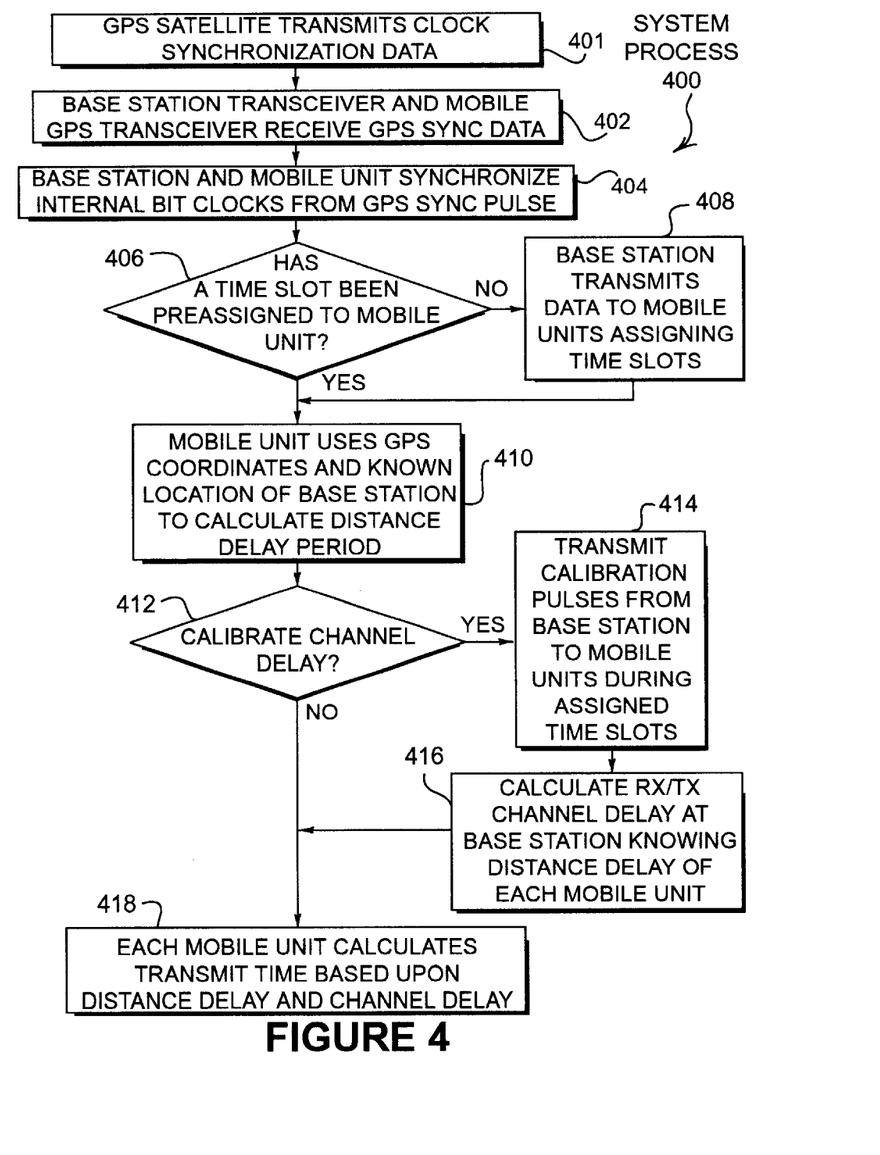
FIG. 4 is a flow diagram illustrating the system processes of the present invention.

FIG. 4 is a flow diagram illustrating the various processes that are performed by the system of the present invention. At step 401, the GPS satellite transmits GPS information that is used to generate a clock synchronization pulse each second. At step 402, the base station transceiver and the mobile GPS transceivers receive the GPS sync data. At step 404, the base station and the mobile unit synchronize their internal bit clocks using the GPS sync pulses that are generated from the GPS sync data, as disclosed in more detail below in FIG. 13. At step 406, the base station determines if time slots have been pre-assigned to the mobile units. If the time slots have not been assigned to the mobile units, the base station transmits data to the mobile units assigning time slots at step 408. Additionally, this may occur when the mobile unit logs onto the system. At step 410, the mobile unit uses the GPS coordinate of the mobile unit and the GPS coordinates of the base station to determine how far the mobile unit is from the base station. The mobile unit can then calculate how long it will take to transmit a signal from the mobile unit to the base station, which is referred to as the distance delay period.

As also shown in FIG. 4, the system of the present invention may be used for calibrating channel delays of the mobile units in the field. The channel delay comprises the delay in the receiver and transmitter circuitry of the mobile unit. The channel delay can comprise a channel delay in the receiver portion of the mobile unit which is the delay that occurs from the time a pulse arrives at the mobile unit, is processed through the receiver and is compared to the internal bit clock of the mobile unit. The transmitter channel delay is the delay that exists between the time an instruction to transmit a pulse is initiated by the microprocessor until a pulse is actually transmitted from the mobile unit transceiver antenna 202 (FIG. 2). The channel delay for both the receiver portion and the transmitter portion of the mobile unit can be calibrated and data stored in the mobile unit at the factory. Additionally, the mobile units can be calibrated in the field as mentioned above. At step 412, it is determined whether one of more mobile units should be calibrated for channel delay. If the mobile units are to be calibrated, at step 414 calibration pulses are transmitted from the base station to the mobile units during the assigned time slot for each particular mobile unit to be calibrated. At step 416, the receiver and transmitter channel delays are calculated by the base station. The base station determines the total delay between the transmission of a calibrated pulse and the receipt of a response to the calibration pulses. The base station also obtains the GPS location information from each of the mobile units prior to calibration. The distance delay for each mobile unit is calculated by the internal logic of the mobile unit. The distance delay date is then subtracted from the total delay to calculate the channel delay. The channel delay information is then transmitted from the base station to the mobile unit. After the mobile unit has been calibrated or if the mobile unit has already been calibrated, the process proceeds to step 418 where each mobile unit calculates the time at which each particular mobile unit can transmit data such that the data arrives in the assigned time slot for that mobile unit at the base station (transmit time). These calculations are based upon the distance delay and the channel delay.

Figure 5:
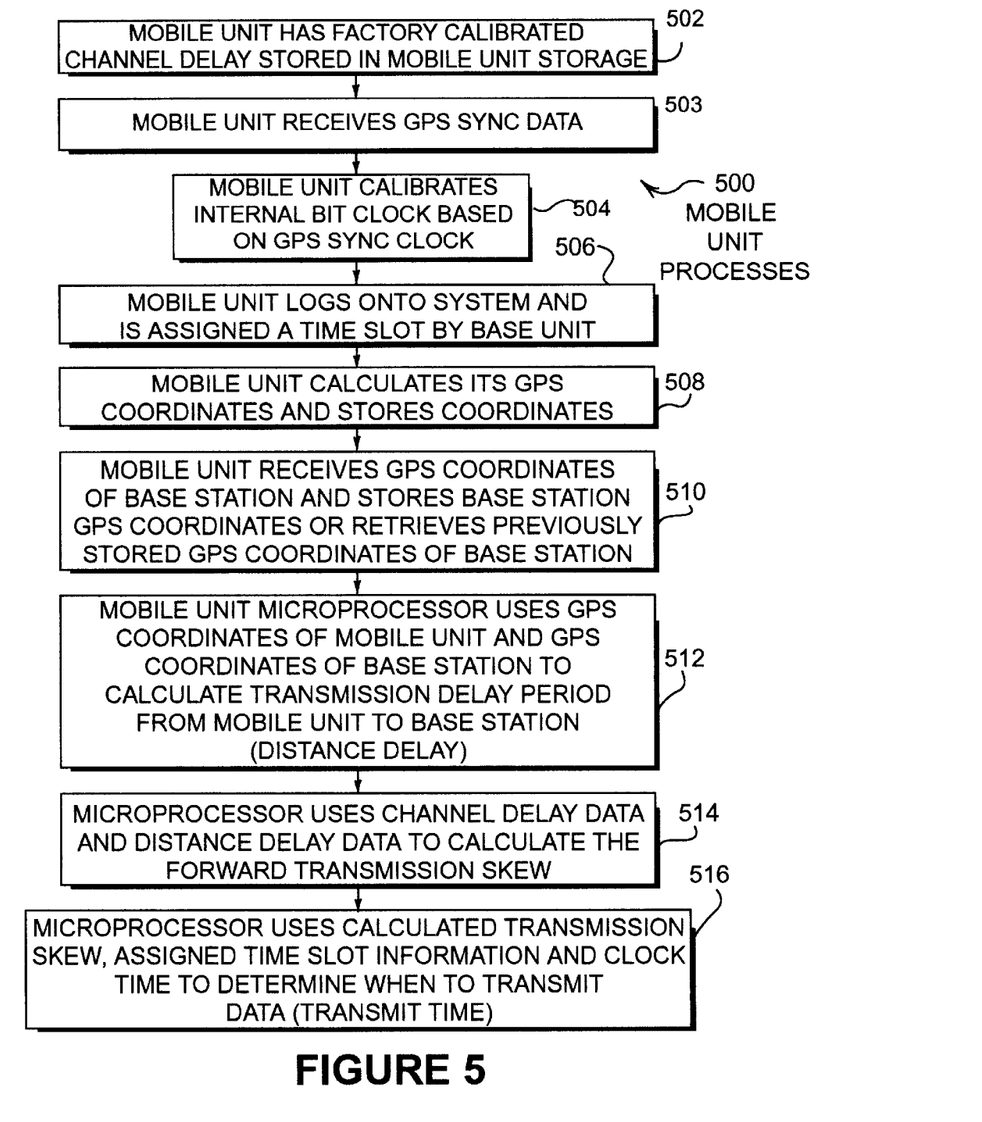
FIG. 5 is a flow diagram illustrating the processes performed by a mobile unit.

FIG. 5 is a flow diagram illustrating one example of a series of steps that may be performed by a mobile unit. At step 502 the mobile unit is calibrated at the factory to include the channel delay information which is stored in a storage unit within the mobile unit for retrieval during operation. At step 503 the mobile unit receives the GPS sync data that is transmitted from the GPS satellite. At step 504 the mobile unit calibrates the internal bit clock of the mobile unit based upon the GPS sync clock that is generated from the GPS sync data, as is disclosed in more detail with respect to FIG. 13. At step 506, the mobile unit logs onto the system and is assigned a time slot by the base unit. As mentioned above, the mobile unit uses conventional techniques for logging on to the system and obtaining an assigned time slot.

At step 508 of FIG. 5, the mobile unit calculates its own GPS coordinates and stores those coordinates for later use. At step 510, the mobile unit receives the GPS coordinates of the base station and stores the base station GPS coordinates or retrieves the base station GPS coordinates that were previously stored by the mobile unit. At step 512, the mobile unit microprocessor uses the GPS coordinates of the mobile unit and the GPS coordinates of the base station to calculate the time it will take to transmit a data pulse from the mobile unit to the base station (distance delay period). The mobile unit microprocessor uses standard techniques to calculate the distance delay period based upon the speed of travel of magnetic waves and the calculated distance between the mobile unit and the base station. At step 514, the microprocessor uses the channel delay data that is stored in the mobile unit and the distance delay data to calculate the forward transmissions skew. The forward transmissions skew is the sum of the channel delay and the distance delay. At step 516, the microprocessor uses the calculated forward transmission skew, the assigned time slot information and the clock time of the internal bit clock of the mobile unit to determine when to transmit the data (transmission time).

Figure 6:
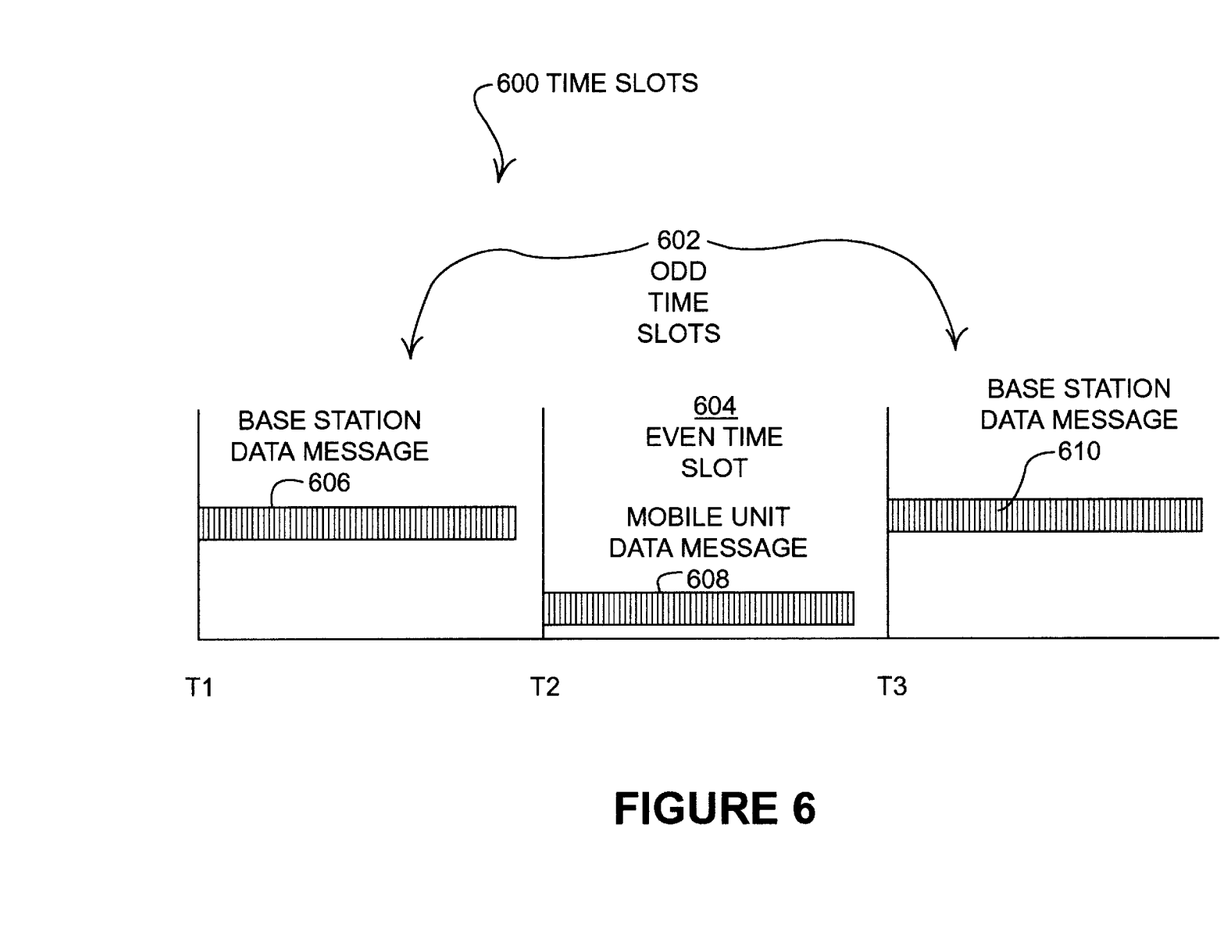
FIG. 6 illustrates one example of the manner in which time slots may be assigned to mobile units and the base station.

FIG. 6 is a time graph illustrating the manner in which time slots 600 can be assigned. As shown in FIG. 6, the odd time slots 602 are assigned to the base station while the even time slots 604 are assigned to individual mobile units. As shown in FIG. 6, the base station sends a data message 606 during a first even time slot between time T1 and time T2. During the second time slot, between T2 and T3, the mobile unit sends a mobile unit data message 608. The mobile unit is a mobile unit that has been assigned to that particular time slot. In time slot 3, between time T3 and T4, the base station sends another data message 610, and the process continues on in the same manner. In this fashion, if each time slot lasts for a period of 1 second, which corresponds to the interval of the GPS sync signal, a total of 30 mobile units could communicate with the base station during one minute.

Figure 7:
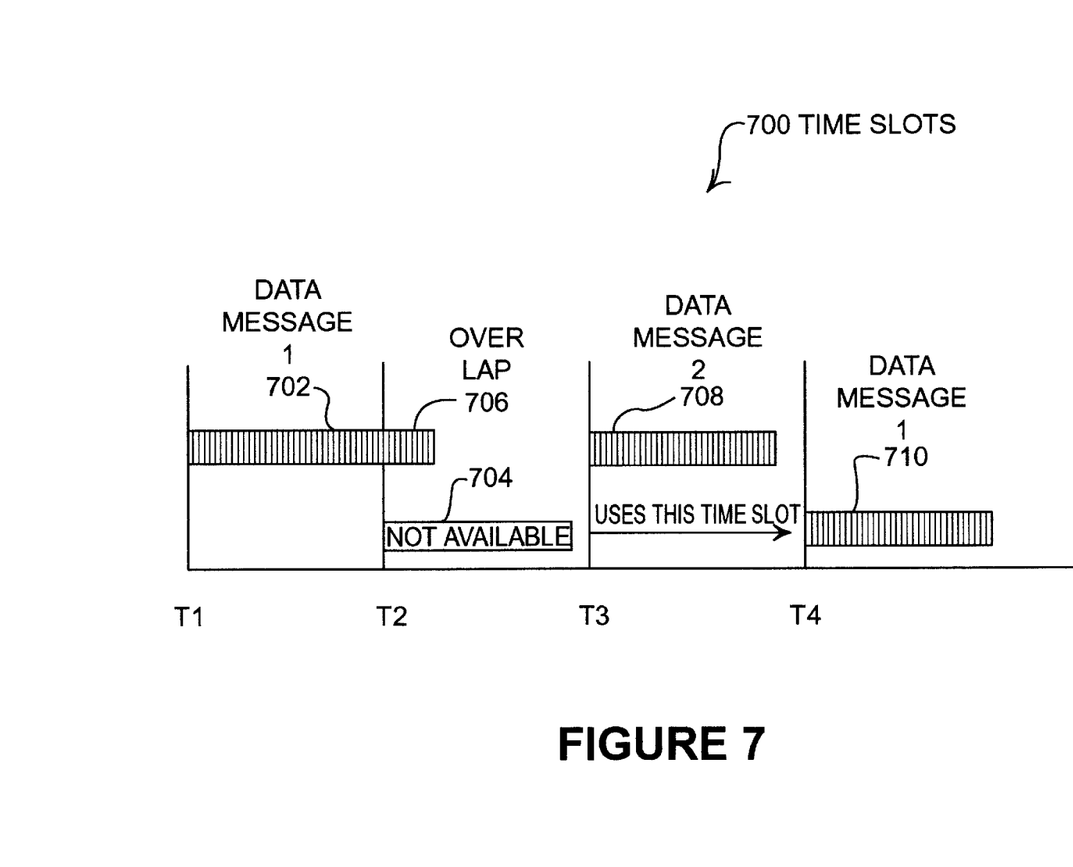
FIG. 7 illustrates the effects of overlap in transmitting data in time slots.

FIG. 7 is another time graph illustrating time slots 700. As shown in FIG. 7, a first data message 702 is transmitted during the first time slot between time T1 and T2, but overlaps by a portion 706 into the second time slot. Whenever the overlaps 706 occurs, the second time slot is not available for transmission of data, as indicated at 704. Otherwise, a possible collision of data could occur. Rather, the data message 710 that would normally be transmitted during this second time slot is now transmitted during the fourth time slot. The second data message 708 is then transmitted, as indicated during the third time slot. FIG. 7 illustrates the manner in which time slots can be corrupted by overlapping portions which may severely degrade the performance of the overall system.

Figure 8:
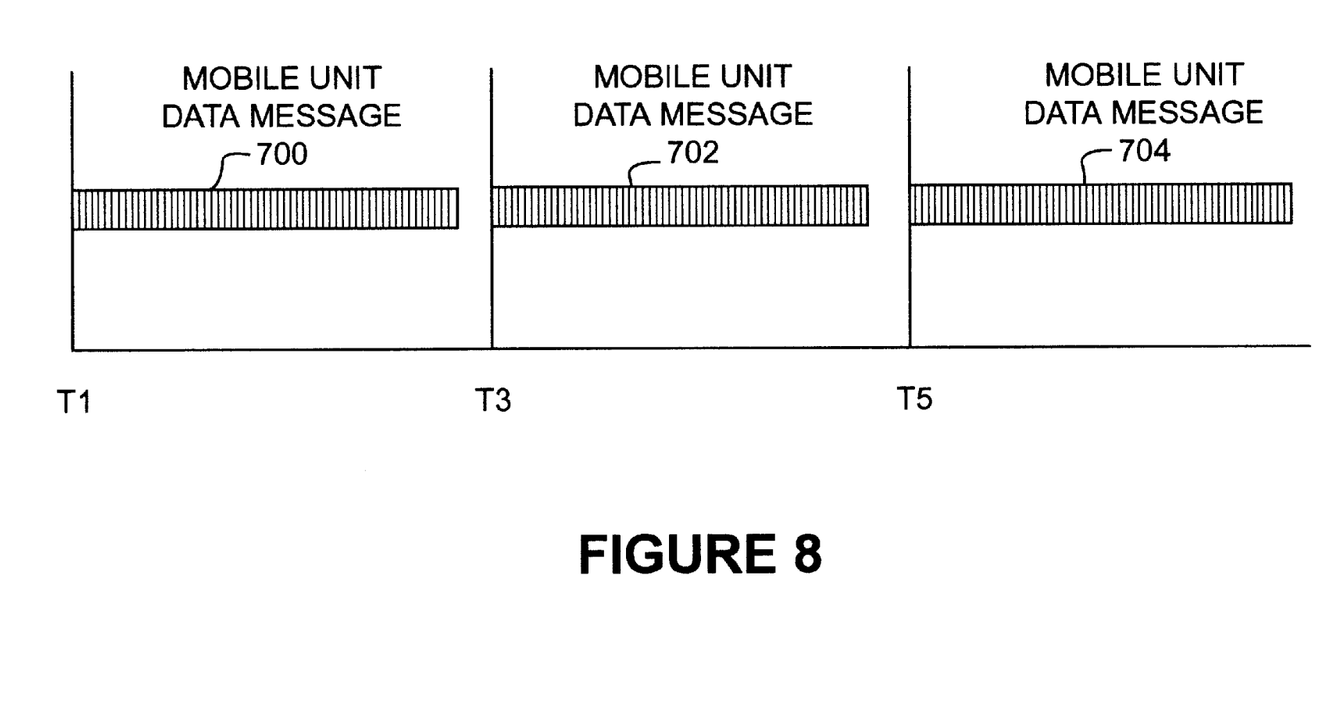
FIG. 8 illustrates another method in which time slots may be assigned to mobile units.

FIG. 8 illustrates an additional method of assigning time slots. As shown in FIG. 8, a first mobile unit sends a mobile unit data message 700 during a first time slot. A second mobile unit is assigned a second time slot and sends a second data message 702 during the second time slot. A third mobile unit sends a data message 704 during a third time slot. In this manner, individual mobile units are assigned different time slots in accordance with the scheme illustrated in FIG. 8.

Figure 9:
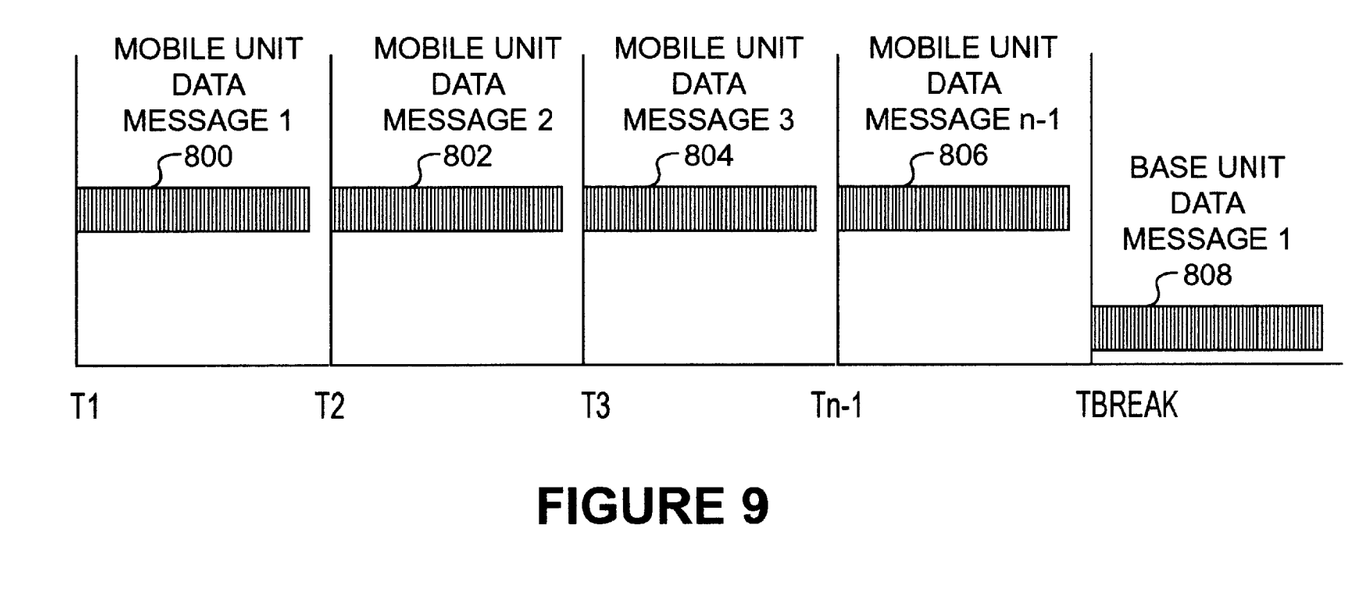
FIG. 9 illustrates a further example of the manner in which mobile units and a base station may be assigned particular time slots.

FIG. 9 illustrates another method of assigning time slots. Individual mobile units send data messages 800–806 during different time slots. The base unit then sends a data message 608 after each of the mobile units has transmitted data. The data message from the base unit can be divided into subunits and directed to different mobile units. The scheme illustrated in FIG. 9 provides the maximum amount of time to allow the mobile units to transmit data, such as GPS data from the mobile unit to the base station.

Figure 10:
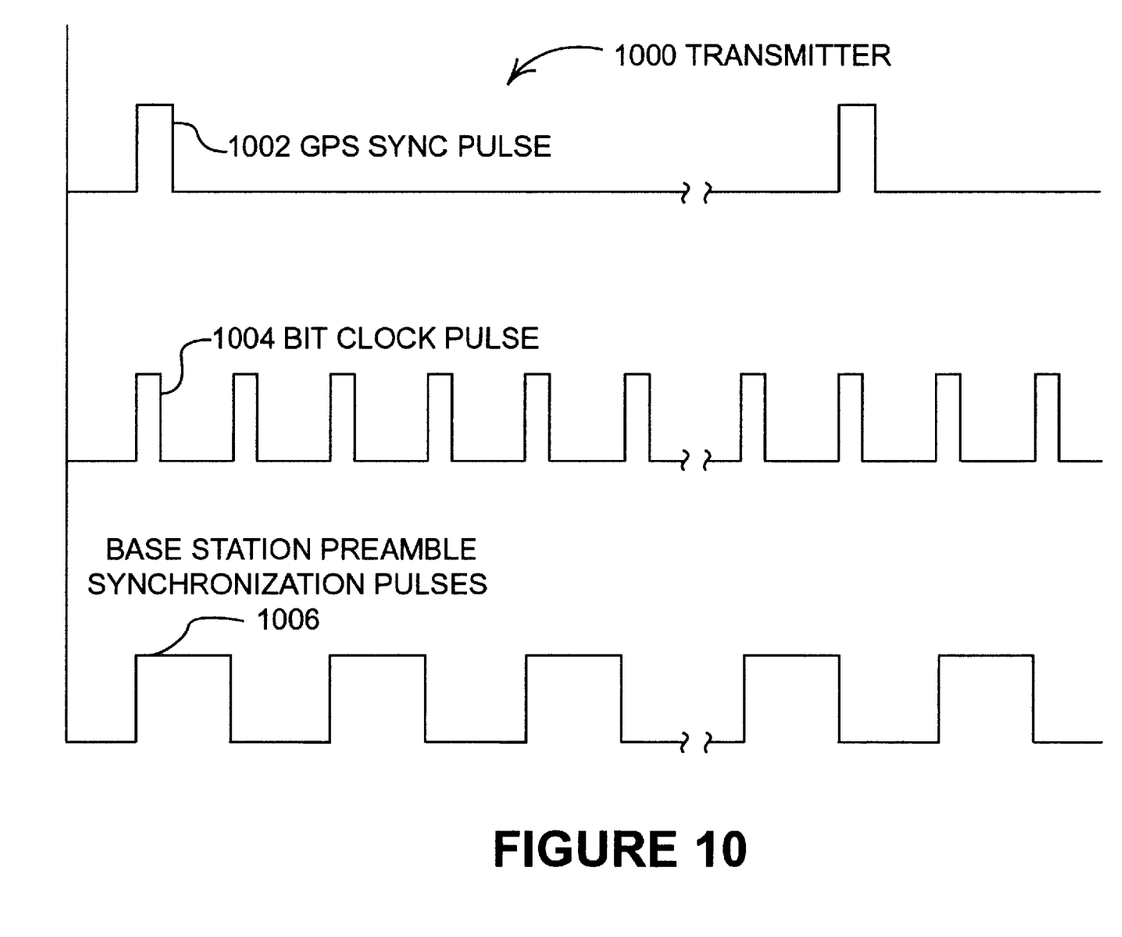
FIG. 10 illustrates the synchronization of pulses in a transmitter.

FIG. 10 is a time diagram illustrating the clock pulses of a transmitter used in accordance with the present invention. As shown in FIG. 10, the GPS sync pulse 1002 is used for synchronizing the pulses of the transmitter. The bit clock pulses 1004 are in-phase and synchronized with the GPS sync pulse 1002. FIG. 10 also illustrates transmitted base station preamble synchronization pulses 1006 that may be transmitted by the base station and are also in-phase and synchronized with the GPS sync pulse. The base station preamble synchronization pulses 1006 constitute an initial portion of a data burst that is transmitted by the base station to correct empirically detected error skew. Of course, the synchronization pulses do not have to be preamble pulses, but can occur at different times from the data burst or in different positions in the data burst.

Figure 12:
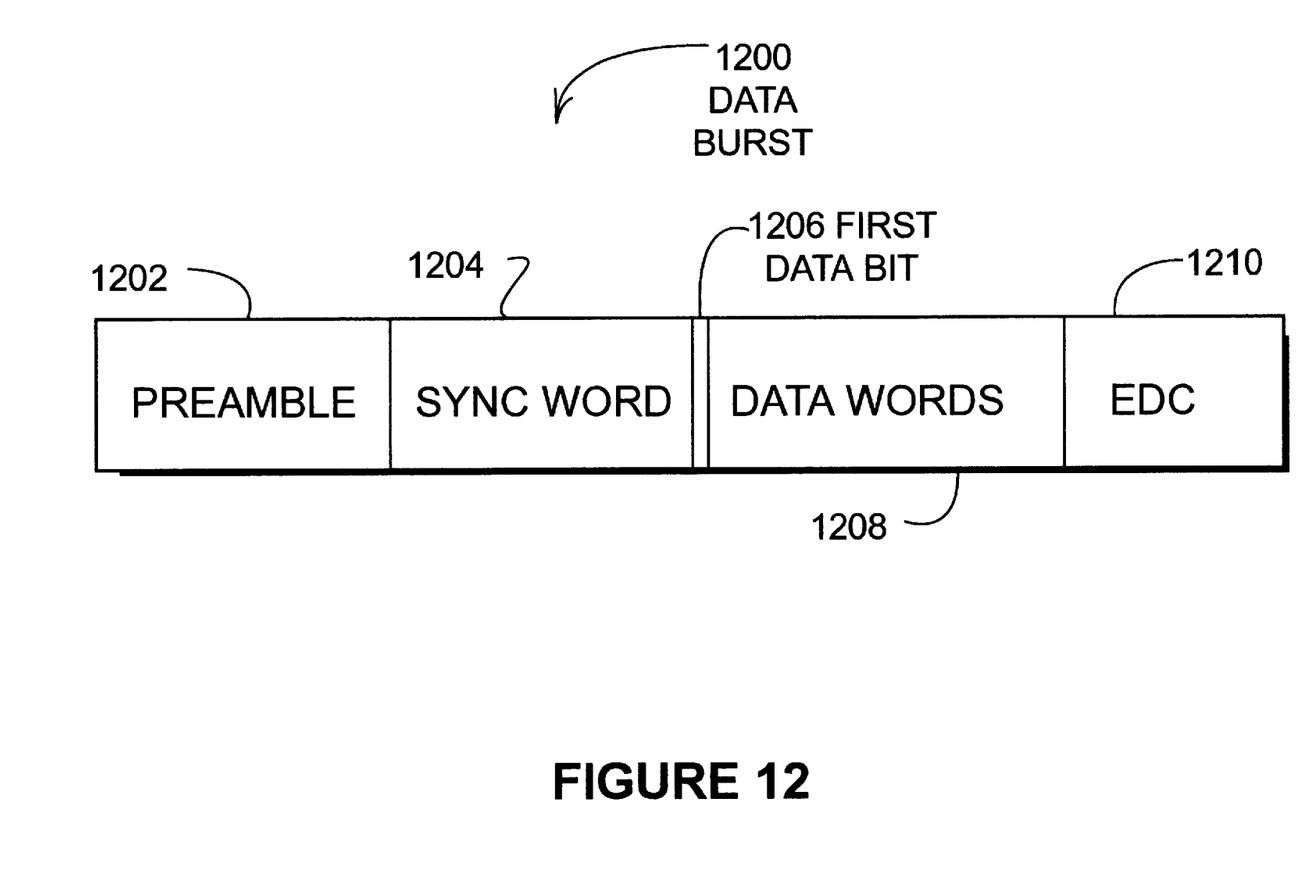
FIG. 12 illustrates the bits that may be included in a data burst.

As shown in FIG. 12, the base station preamble synchronization pulses 1202 comprise the first portion of a data burst 1200. The base station preamble synchronization pulses are a series of alternating 1's and 0's that allow synchronization in the manner disclosed in FIG. 14. Following the preamble synchronization pulses is a sync word 1204. The sync word points to the first data bit 1206 and identifies the location of the first data bit in the data burst 1200. Following the first data bit, is the data to be transmitted in data words 1208. Following the data 1208, is error detection code 1210.

Figure 11:
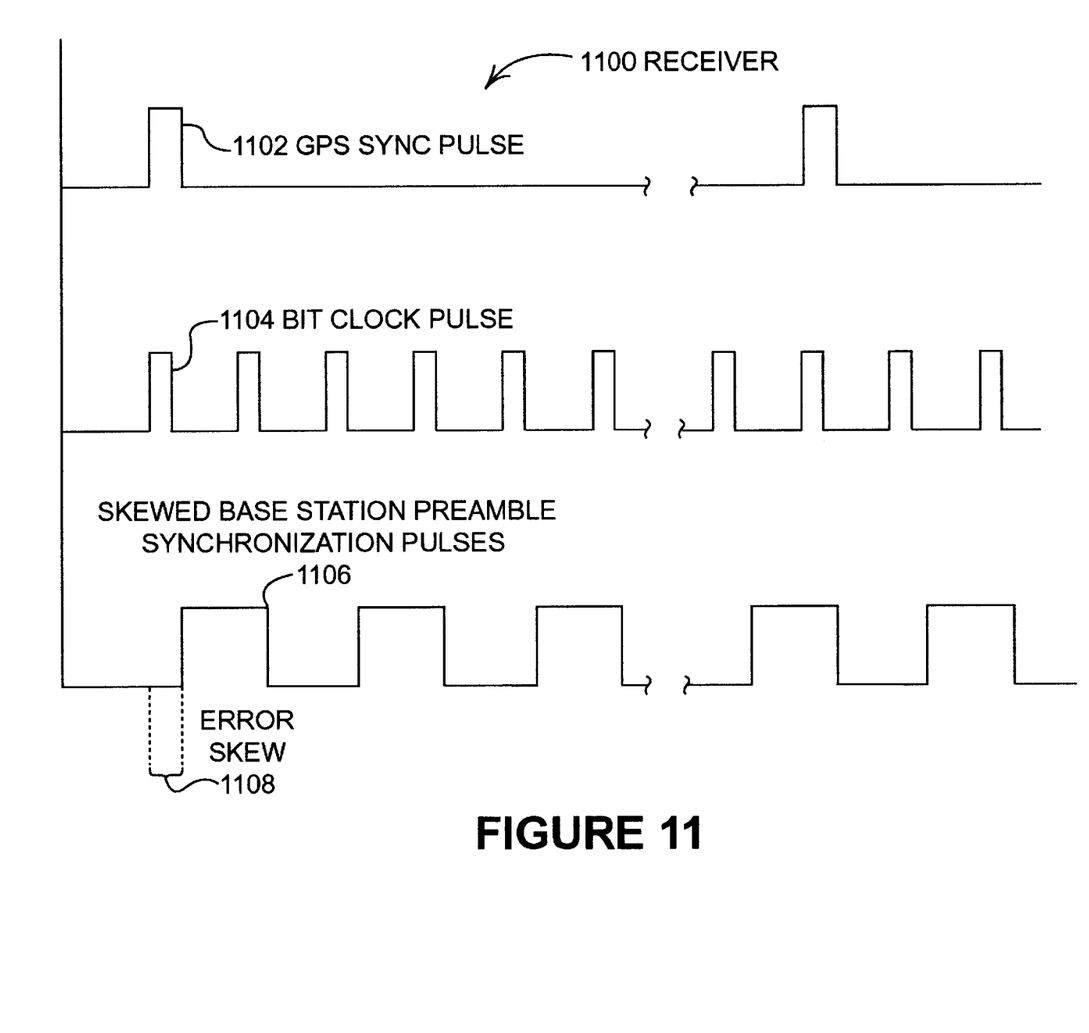
FIG. 11 illustrates error skew that may occur in a receiver.

FIG. 11 discloses the manner in which the receiver of the mobile unit uses the base station synchronization pulses 1100 to empirically detect an error skew 1108. As shown in FIG. 11, a GPS sync pulse 1102 is generated by the mobile unit. The mobile unit generates internal bit clock pulses 1104 that are in-phase and synchronized with the GPS sync pulse 1102. However, the base station preamble synchronization pulses may be skewed by an amount shown by the error skew 1108. The error skew may occur because of the sum of the channel delay and the distance delay do not account for the entire delay of the system. The skewed base station preamble synchronization pulses 1106 provide a way of empirically measuring any error skew 1108 that exists in the system and provides a system check to insure that the calculated delays provide the proper synchronization.

Figure 13:
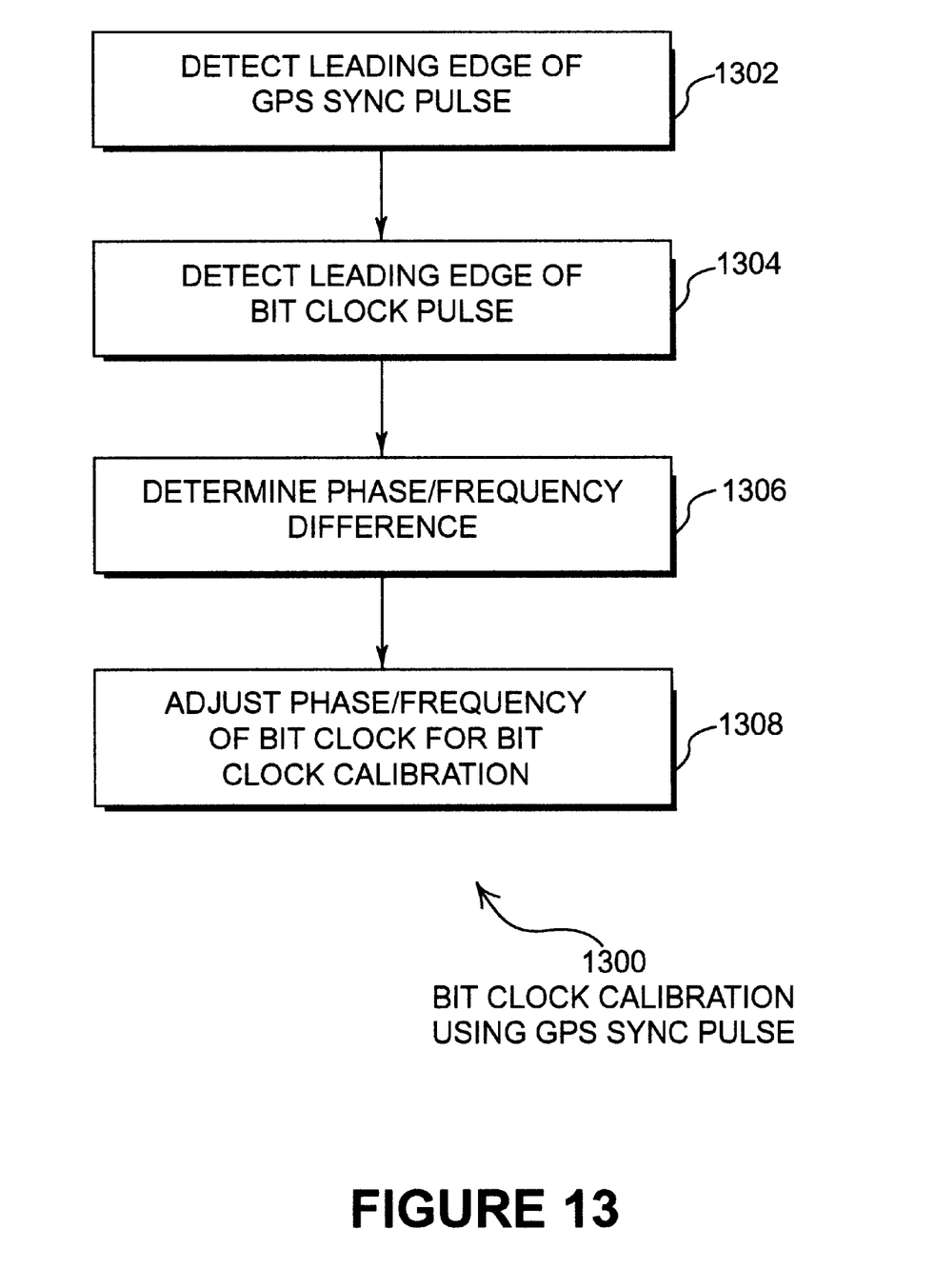
FIG. 13 is a flow diagram illustrating bit clock calibration using a GPS sync pulse.

FIG. 13 is a flow diagram 1300 of the process of bit clock calibration that is performed in both the mobile unit and the base unit using the GPS synchronization pulse. At step 1302, the leading edge of the GPS synchronous pulse is detected. At step 1304, the leading edge of the internal bit clock of either the mobile unit or the base station is detected by those units respectively. At step 1306 the phase difference and/or frequency difference between the bit clock pulses and the GPS sync pulse is determined by the internal microprocessor of the mobile unit/base station. At step 1308 the phase and/or frequency of the internal bit clock of the mobile unit/base station is adjusted to provide the proper bit clock calibration.

Figure 14:
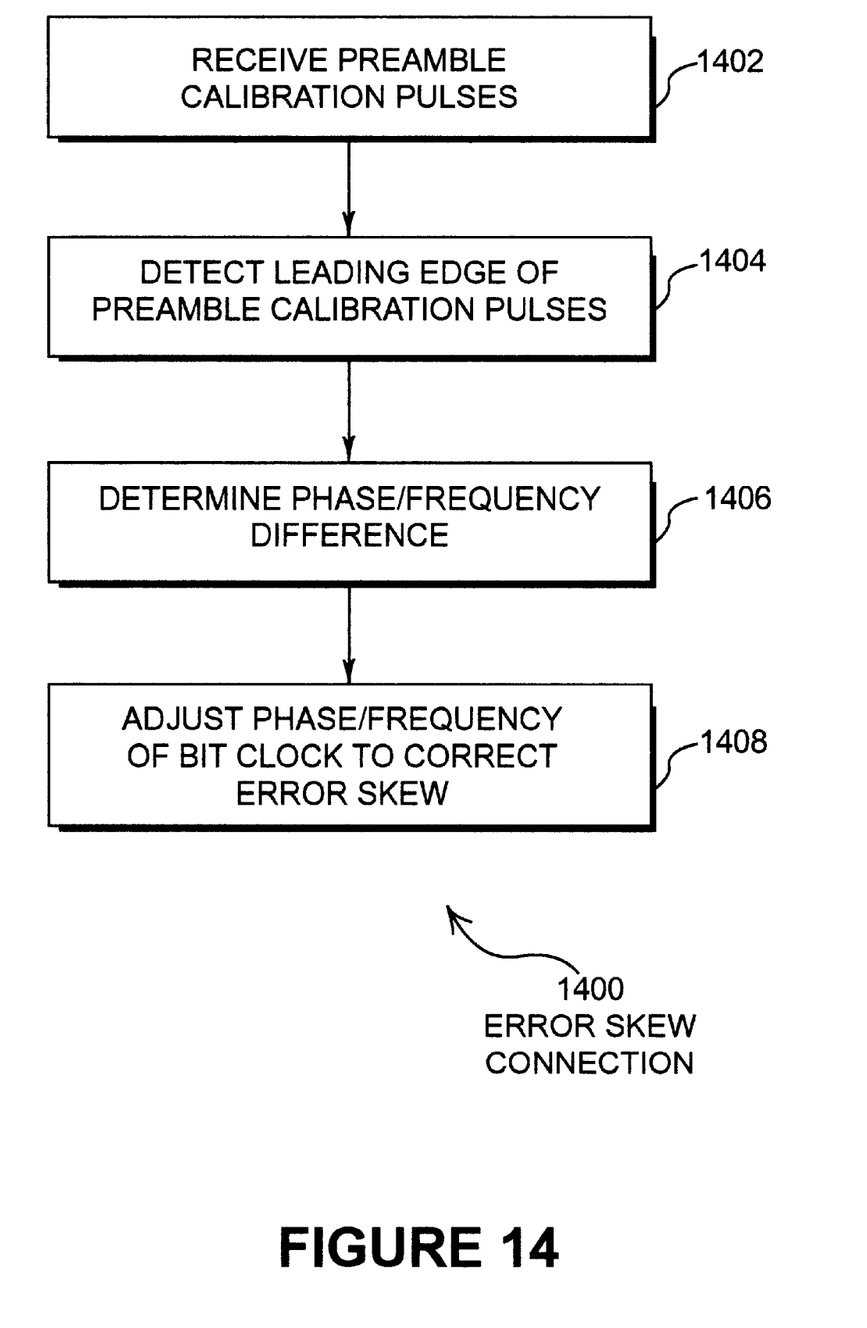
FIG. 14 illustrates the steps required for error skew correction.

FIG. 14 is a flow diagram illustrating the steps 1400 performed by the mobile units to correct error skew. At step 1402, the mobile unit receives the base station preamble synchronization pulses 1006 illustrated in FIG. 10. At step 1404, the mobile unit detects the leading edge of the base station preamble synchronization pulses. At step 1406, the mobile unit determines the phase and/or frequency difference between the received base station preamble synchronization pulses 1106 and the bit clock pulses 1104 that are illustrated in FIG. 11. The mobile unit, at step 1408, then adjusts the phase and/or frequency of the bit clock to correct the empirically detected error skew 1108 that is illustrated in FIG. 11.

The present invention therefore provides a system that is capable of accurately assigning time slots and synchronizing the transmission of data between mobile units that may be moving or changing location and a stationary or moving base station. The system of the present invention utilizes GPS receivers in the mobile units and base station that synchronize internal bit clocks using the GPS Sync Pulses. In this fashion, the bit clocks of the mobile units and base station can be synchronized in a manner that is only limited by the error of the very precise GPS clock system. Further, since the GPS clock data is provided by the GPS receivers that are onboard the mobile units and the base station, time shift signals relating to the position of the mobile units do not need to be determined. Additionally, GPS coordinate data of each of the moving mobile units can be used by the mobile units to calculate the time required to transmit data from the remotely located mobile units to the base station. This is done by calculating the distance between the base station and the mobile unit using the GPS coordinates of the mobile unit and the base station. In this fashion, the transmit time can be accurately calculated using the distance delay and the channel delay. Also, because the mobile unit internal bit clocks and the base station internal bit clock are synchronized using the GPS synchronous signal from the GPS receiver, rather than a series of timing pulses that are transmitted between the base station and the mobile units, the system is less prone to noise error. Further, the system of the present invention is capable of eliminating any error skew that may exist in the system by detecting preamble synchronization pulses and comparing the phase of the preamble synchronization pulses with the calibrated internal bit clock pulses. This technique insures that proper sampling of data occurs in the mobile unit. Hence, the present invention provides a unique and accurate method of synchronization that is highly reliable and allows for maximum transmission time of data.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of synchronizing the transmission of information in assigned time slots between mobile transceiver units having GPS receivers and a base station having a GPS receiver comprising:

using said GPS receiver in said mobile units for receiving GPS synchronization data;

using said GPS receiver in said base station to receive said GPS synchronization data;

using a GPS synchronization pulse generated from said GPS synchronization data to synchronize internal bit clocks in said mobile units and said base station to provide GPS synchronized internal bit clocks in said mobile units and said base station;

transmitting base station synchronization pulses from said base station to said mobile units that are synchronized with said GPS synchronized internal bit clock of said base station;

further synchronizing said GPS synchronized internal bit clocks of said mobile units with said base station synchronization pulses to produce empirically synchronized internal bit clocks of said mobile units;

transmitting data from said mobile units in assigned time slots using said empirically synchronized internal bit clocks of said mobile units.

2. The method of claim 1 further comprising:

using GPS coordinate data of said mobile units and said base station to generate distance delay data that is representative of a time period required for transmitting data between said mobile unit and said base unit, obtaining channel delay data for said mobile units;

generating forward transmission skew data for said mobile units from said distance delay data and said channel delay data.

3. The method of claim 2 further comprising:

generating a transmission time for each mobile unit from said forward transmission skew, assigned time slot information and said internal bit clocks of said mobile units that are synchronized to said GPS synchronization pulse.

4. The method of claim 2 wherein said step of obtaining channel delay data comprises:

retrieving said channel delay data from a storage device associated with said mobile unit.

5. The method of claim 2 wherein said step of obtaining channel delay data comprises: obtaining said channel delay data from field tests of said mobile units.

6. A system for synchronizing the transmission of data in assigned time slots comprising:

mobile units that have communication transceivers;

a base station having a communication transceiver for communicating with said mobile units;

GPS receivers disposed in said mobile units and said base station that receive GPS synchronization data and generate GPS synchronization pulses and GPS coordinate information from said GPS synchronization data;

internal bit clocks disposed in said mobile units and said base station that are calibrated to said GPS synchronization pulses to produce GPS synchronized internal bit clocks;

logic control devices disposed in said mobile units that are programmed to control the transmission of data from said mobile units to said base station in assigned time slots and that are programmed to further synchronize said GPS synchronized internal bit clocks of said mobile units with base station synchronization pulses, said base station synchronization pulses being synchronized with said GPS synchronized internal bit clock of said base station.

7. The system of claim 6 whereas said logic control devices comprises:

microprocessors programmed to use said GPS coordinate data to generate distance delay data this is representative of a time period required to transmit data between said mobile units and said base unit, obtain channel delay data for said mobile units and generate forward transmission skew data from said distance delay data and said channel delay data.

8. The system of claim 7 wherein said microprocessors comprise:

microprocessors that are further programmed to generate a transmission time that indicates the time at which said mobile units can transmit data so that said data arrives at said base station in said assigned time slots using said forward transmission skew data, assigned time slot information for said mobile units and said GPS synchronized internal bit clocks.

* * * * *